Figure 1:
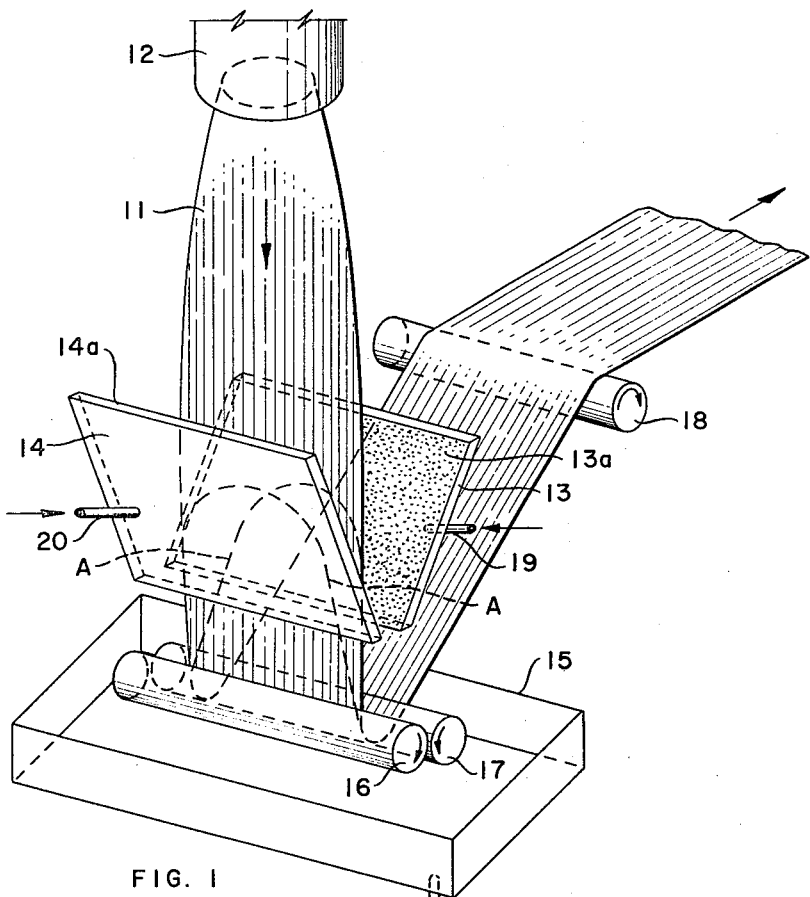
Figure 2:
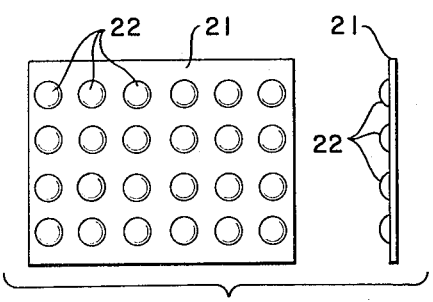

United States Patent
van Kralingen

[15] 3,700,763
[45] Oct. 24, 1972

[54] TUBULAR WATER QUENCH PROCESS WITH WATER FILM COOLING

[72] Inventor: Peter H. van Kralingen, Delft, Netherlands
[73] Assignee: Shell Oil Company, New York, N.Y.
[22] Filed: Aug. 13, 1969
[21] Appl. No.: 849,849

[30] Foreign Application Priority Data
Dec. 31, 1968    Great Britain..........61,899/68

[52] U.S. Cl. .....................264/95, 264/178, 264/237, 264/348, 425/71, 425/326
[51] Int. Cl........B29c 17/07, B29c 25/00, B29d 7/20
[58] Field of Search........264/95, 175, 237, 178, 348; 18/14 A, 14 S, 8 QA; 425/325, 326, 71

[56] References Cited

UNITED STATES PATENTS

| | | | |
|---|---|---|---|
| 1,591,170 | 7/1926 | Lutyens | 264/175 |
| 2,337,927 | 12/1943 | Reichel et al. | 264/95 UX |
| 3,274,317 | 9/1966 | Batosti et al. | 264/95 |
| 3,377,413 | 4/1968 | Jansson et al. | 264/95 |
| 3,543,334 | 12/1970 | Sudo | 264/95 |

FOREIGN PATENTS OR APPLICATIONS

1,093,018    11/1967    Great Britain...............264/95

*Primary Examiner*—Robert F. White
*Assistant Examiner*—Jeffery R. Thurlow
*Attorney*—Joseph W. Brown

[57] ABSTRACT

Film of an organic thermoplastic polymer is manufactured by drawing an extruded, inflated, hot, tubular film from an extruder and passing the film into contact with layers of cooling liquid supported by symmetrically disposed collapsing elements adapted to effect a partial but not complete collapse of the tubular film to the lay flat form, cooling liquid being simultaneously supplied to a plurality of locations distributed over the surfaces of the collapsing elements at a rate sufficient to maintain layers of cooling liquid thereon.

4 Claims, 10 Drawing Figures

PATENTED OCT 24 1972 3,700,763

SHEET 1 OF 2

INVENTOR:
PETER H. VAN KRALINGEN
BY: Philip D. Freedman
HIS ATTORNEY

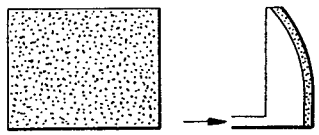
FIG. 5
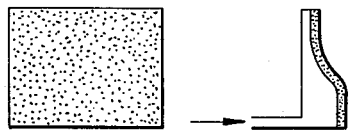
FIG. 6
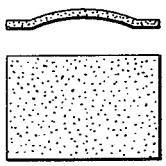
FIG. 7
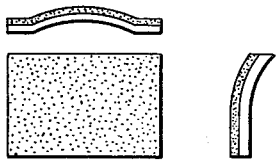
FIG. 8
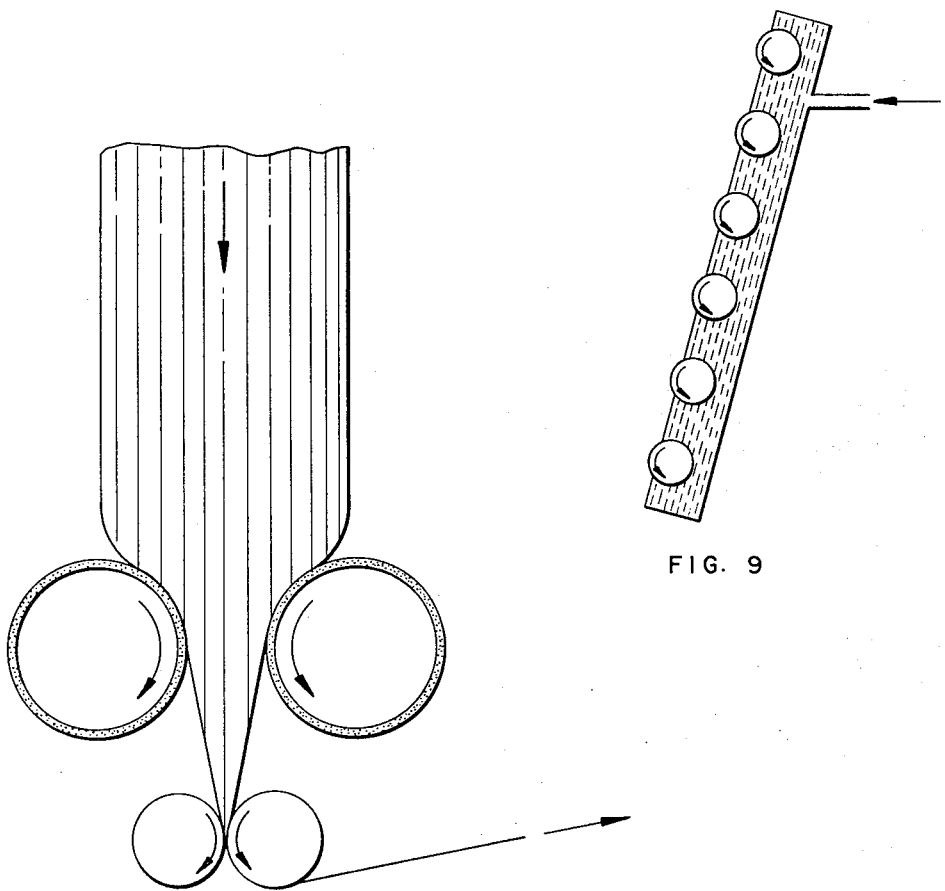
FIG. 9
FIG. 10

TUBULAR WATER QUENCH PROCESS WITH WATER FILM COOLING

The present invention is concerned with the manufacture of films from organic thermoplastic polymers, for example, polypropylene by a process (hereinafter referred to as "a process of the kind defined") in which an internally-blown film is extruded continuously and in a downward direction from an organic thermoplastic polymer melt and the resulting blown tube or bubble is cooled and flattened to "lay-flat" form. The present invention is also concerned with the resulting films in lay-flat form or slit into sheets, tapes, ribbons or filaments.

It is known to employ water as a cooling medium in processes of the kind defined above. Many proposals have been made in regard to the manner in which the blown tube is brought into contact with the cooling water. For example, the use of a water bath has been proposed. However, the process of this proposal is difficult to control and produces a poor clarity product unless special techniques such as described in U.S. Pat. Application Ser. No. 710,566, Chein-Ho, (now U.S. Pat. No. 3,539,669), are employed. Another method based on the concept of a water cascade on the outer surface of the blown tube has also been proposed. But this method also has disadvantages such as film size limitations. There is also a tendency for variations in the film cooling efficiency occurring with small changes in the film tube diameter. The cascade can be formed by passing the blown tube through a fixed guide means such as a ring or tube provided, for example, with an annular water trough. The water overflowing from the trough passes down the outer surface of the blown tube as an enveloping "curtain" or "cascading column". The curtain or column can be wholly or mainly exposed to the surrounding atmosphere as in the case of the method described, for example, in U.K. Pat. Nos. 876,460 and 872,115 in which the cooling water is supplied by one or more annular rings through which the blown tube passes. Alternatively, the curtain or cascading column of water can be confined within the annular space formed between the outer surface of the blown tube and the inner surface of a cylindrical metal tube through which the blown tube passes as in the case of the method described, for example, in U.K. Pat. Nos. 853,745 and 741,963. The cooling water can also be supplied by sprays surrounding the top of the blown tube in place of the aforesaid annular trough. In another approach to the problem of effecting adequate cooling of the blown tube, the latter is passed through a water bath while its interior surface is colled by contact with an internal, smooth-surfaced cooling mandrel. Such a technique is described, for example, in U.K. Pat. Nos. 1,061,342 and 1,043,933. The concept of cooling the interior of the blown tube with a water curtain or cascade has also been proposed but inevitably this leads to complications in both the design of the equipment and in the operation thereof.

In general, water cooling techniques involving the use of an annular ring or tube through which the internally-blown tube must pass suffer the disadvantage of lack of flexibility in regard to the size of the blown tube which can be handled. To be effective the ring or tube must provide an even water cascade or curtain over the whole of the outer surface of the blown tube. In practice this usually means that a particular equipment can produce only one size of blown tube. Moreover little or no variation in blown tube diameter can be tolerated during the operation of the equipment.

Other important factors arise in the operation of any equipment in which cooling is effected by means of a water curtain or cascade on the external and/or internal surface(s) of blown tube. For example, an even cooling over the whole surface of the blown tube is essential not only in order to maintain stability of the blown tube but also to avoid optical variations in the resulting thermoplastic film. Also, when the cooling water is applied to the blown tube by means of sprays which exert pressure on the external surface thereof particular care must be taken to avoid localized concavities or convexities which can arise from local variations in the water pressure over the tube surface. With any of the methods hitherto proposed for supplying the cooling water to the blown tube the maintenance of an enveloping cascade or curtain of cooling water of the same water thickness round the whole circumference of the blown tube can be difficult. This is particularly so when the blown tube passes through a surrounding metal tube of significant depth within which local "hot spots" can easily develop due to localized "thinning" of the water film.

The present invention is based on a new approach to the cooling problem in which the blown tube is pressed against supported water films solely by the fluid pressure within the blown tube. The blown tube is thereby both cooled and partially flattened under conditions which result in even cooling and even pressure over the entire water-cooled surface. The water films are supported in such a manner that within relatively wide limits blown tubes of any diameter can be handled. Minor variations in the diameter of the blown tube which occur from time to time during operation of the process have substantially no effect on the optical properties of the resulting film or on the stability of the blown tube itself or on the cooling efficiency of the process.

According to the present invention a process of the kind defined for the manufacture of film from a thermoplastic organic polymer, comprises drawing an extruded, inflated, hot, tubular film from an extruder and passing the hot tubular film into contact with layers of cooling liquid supported by symmetrically disposed collapsing elements adapted to effect a partial but not complete collapse of the tube to the "lay-flat" form, cooling liquid being supplied simultaneously to a plurality of locations distributed over the surfaces of the collapsing elements through a plurality of apertures or channels in the walls of the collapsing elements at a rate sufficient to maintain the layers of cooling liquid thereon. The present invention also includes the resulting film.

The present invention also includes apparatus for cooling an extruded, inflated, hot, tubular film of an organic thermoplastic polymer during the manufacture of film by a process of the kind defined. The apparatus comprises a pair of collapsing elements adapted to effect a partial but not complete collapse of a hot inflated film to the lay-flat form, each of collapsing elements being provided with means for supplying a cooling liquid simultaneously to a plurality of locations distributed over the surface thereof through a plurality of apertures or channels in the wall of the collapsing element in such a manner that a layer of cooling liquid can be maintained on the surface.

Although not limited in regard to the shape and nature of collapsing elements used, the process of the present invention will usually employ two such elements. The general shape and symmetrical disposition with respect to the blown tube of such collapsing elements can be generally similar to the collapsing boards or frames well known in the film manufacturing and processing art, but other forms of collapsing elements can be used. Usually the cooling liquid will be water. Preferably the collapsing elements are used in combination elements. The partially collapsed blown tube is led into the bath and between nip rollers disposed therein which effect a complete collapse of the blown tube to the lay-flat form. Preferably the collapsing elements are disposed so as to provide guiding surfaces which support the partially collapsed blown tube as it enters the cooling liquid bath in order to prevent wrinkling or marking thereof.

Advantageously the collapsing elements are made from porous metal, the pores constituting a multiplicity of apertures in the walls thereof. In such cases porous metal plates of any suitable shape can be employed. Cooling liquid can be supplied thereto by providing a water chamber (or even a plurality of separate inlet ports) at the rear of the plates. The chamber extends over part or all of the rear surface thereof. Alternatively, plates having a plurality of channels or grooves in the surface thereof or having a number of spaced apertures of any conventional shape, opening into said surface, for example, circular holes can be used in place of porous metal plates. The collapsing elements can be flat plates or plates shaped in the direction of film travel so as to provide support for the curved lower part of the blown tube. The elements can also be at right angles so as to correspond to the shape of the lower part of the blown tube at its line of first contact with the collapsing elements. Porous or apertured rollers can also be used as collapsing elements. Alternatively, each collapsing element can comprise a box-like structure having a plurality of freely rotatable rollers disposed in longitudinal slots in one surface thereof so as to project slightly therefrom. The rollers rotate with clearance in the slots so as to permit cooling liquid to flow from the hollow interior of the collapsing element onto the surfaces of the rollers and onto those portions of the surface of the collapsing element which lie between the rollers. If desired, the collapsing elements may be joined by side portions where the elements come close together at their lower edges to effect cooling of the two opposed side portions of the blown tube which otherwise might not contact the collapsing elements.

The process of the present invention provides for an even water cooling of a downwardly-extruded blown film by means of water layers in which the water flow is parallel to the direction of movement of the film. At the same time a partial flattening of the blown tube is achieved by means of symmetrically disposed collapsing elements. Usually this partial collapse of the blown tube will be such that the tube is brought quite near to the lay-flat form. Preferably the line of first contact between the blown tube and each of the collapsing elements approximates a horizontal line over as much as possible of the tube's length. This may be achieved by suitably shaping the tube-contacting surface of each of the collapsing elements in the manner described herein.

The present invention can be applied to the manufacture of film from any thermoplastic organic polymer which is suitable, in regard to softening point and melt stability, for use in a process of the kind defined. Suitable thermoplastic organic polymers include, for example, polyvinyl chloride, polyesters, nylons and polyolefins. The present invention is particularly applicable to crystalline polymers, for example the nylons and polyolefins. The term "polyolefin" is used herein to include an olefin polymer or copolymer as such and also a polymer composition the major part of which is a polyolefin or mixture thereof. Examples of polyolefins which can be used in carrying out the process of the present invention are polyethylene and polypropylene. The present process is particularly suitable for the manufacture of high clarity polypropylene film having good physical properties.

It is a particular advantage of the invention that various widths and thicknesses of film can be manufactured at high throughput rates with the same cooling unit, and in general blow-up ratios in the range of 0.1 to 2.0 can be employed.

The present invention will be further described with reference to the accompanying diagrammatic drawings in which:

FIG. 1 is a schematic drawing showing a general arrangement for film manufacture in accordance with the present invention, FIGS. 2–8 are schematic representations showing various forms of plate-like collapsing elements, FIG. 9 is a schematic drawing showing an alternative form of collapsing element, and FIG. 10 is a schematic representation showing the use of collapsing elements in the form of porous rollers.

Referring to FIG. 1, a hot blown tube 11 of, for example, polypropylene is extruded downwardly from an extruder die 12 of conventional form and is cooled, in accordance with the present invention, by means of a cooling unit comprising a pair of porous plates 13, 14 which constitute the collapsing elements and a body of cooling water contained in a tank 15. The plates 13, 14 also effect a partial collapse of the blown tube 11, complete collapse to the lay-flat form being achieved by driven nipping rollers 16, 17 located within the cooling water in the tank 15. These nipping rollers 16, 17 also serve to draw down the blown tube 11 from the extruder die 12. The lay-flat film is removed over a roller 18 by conventional haul-off equipment (not shown). Each of the porous plates 13, 14 comprises a thin hollow box having a porous front surface 13a, 14a adapted to contact the blown film, and an inlet pipe 19, 20 for supplying water under pressure to the interior of the box. In operation the water in the interior of the box permeates to the front surface 13a or 14a through the pores thereof to form a layer of cooling liquid on the surface 13a or 14a. The size of the pores is such that under the water pressure employed an adequate thin layer of cooling water is maintained on the surfaces 13a and 14a during operation of the cooling unit. The cooling water can be supplied to the collapsing elements at ambient temperature, for example at 10° to 20°C, and its rate of supply should be such that thin layers of water are maintained over the whole surface thereof during operation of the process.

Figure 3:
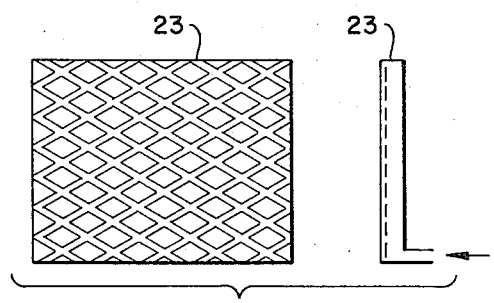
Figure 4:
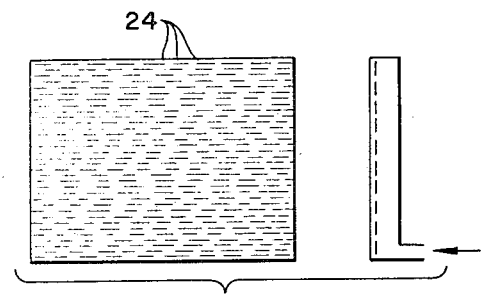

Referring to FIGS. 2–8, FIG. 2 shows a collapsing element in the form of a plate 21 having a large plurality of convex protuberances 22, all of the same size and shape, on its surface. The spaces between the protuberances 22 provide channels for the supply of cooling liquid to the whole surface of the plate 21, the liquid being supplied from the top of the plate. FIG. 3 shows a collapsing element in the form of a hollow box 23 having an apertured front surface containing a number of diamond-shaped apertures through which cooling water can be supplied. FIG. 4 shows a somewhat similar collapsing element in which the apertures comprise slits 24. FIGS. 5 and 6 show porous plate collapsing elements which are shaped in the direction of travel of the blown tube to provide additional guidance and support for the blown tube. FIG. 7 shows a porous plate collapsing element which is shaped at right angles to the direction of travel of the blown tube in order to straighten the line of first contact of the blown tube with the collapsing elements. As will be apparent from FIG. 1 this line of first contact (shown dotted at A) tends to be parabolic in form when the plates have a flat surface.

The present invention can be illustrated by the following example

EXAMPLE

Polypropylene film was manufactured in accordance with the process described with reference to FIG. 1 of the accompanying drawings, the collapsing elements comprising porous plates each shaped to provide a downwardly and inwardly extending flat surface 40 centimeters in length for partially collapsing, and cooling, the blown tube and a flat vertical portion forming a guide for the film as it entered the water bath. The bottom edge of this vertical portion was therefore below the water surface, and the two plates were disposed so that their respective vertical portions were 2 millimeters apart. The collapsing portion of each of the collapsing elements was at an angle of 160° to the vertical and the mid-part of each collapsing element lying between the collapsing portion and the vertical portion was curved, the radius of curvature being 12.5 centimeters. The water level in the tank was just below this radiused mid-part of the collapsing elements. The collapsing elements comprised sheets of porous copper material. Cooling water was supplied thereto by water chambers welded to the back of the plates and covering the upper part of the rear surfaces thereof. The polypropylene was extruded downwardly in conventional manner. In a number of runs the blow-up ratio was varied to produce films of various widths, with film thicknesses of 30, 50 and 100 microns. Using a 200 millimeter diameter annular extrusion die and operating at a melt temperature of 240°C, polypropylene films of good optical and mechanical properties were obtained under the following conditions

| | |
|---|---|
| Cooling water input temperature | 15°C |
| Cooling water supply rate (to both collapsing elements) | 5 liters per minute |
| Blow-up ratios | 0.4; 0.6; 0.8; 1.2 |
| Film production speed | 15,30 meters/minute |

I claim as my invention:
1. A process for the manufacture of a film of an organic thermoplastic polymer at a rate of production of 15-30 meters/minute which comprises
   1. drawing an extruded, inflated, hot, tubular film from an extruder; while at the same time
   2. supplying a cooling liquid simultaneously to a plurality of locations distributed over the surfaces of symetrically disposed plate-like collapsing elements, which are adapted to effect partial but not complete collapse of the tubular film to the lay flat form, said cooling liquid being supplied at a rate sufficient to maintain layers of cooling liquid on said collapsing elements; and
   3. passing said hot, tubular film into initial liquid quenching contact with the said layers of cooling liquid wherein said contact is provided solely by the pressure within the tubular film.

2. A process as claimed in claim 1, wherein said cooling liquid is water.

3. A process as claimed in claim 1, wherein said partially collapsed film is passed into a cooling liquid bath and therein is completely collapsed to lay-flat form.

4. A process as claimed in claim 1, wherein said hot tubular film is passed into first contact with said layers of cooling liquid said first contact approximating a horizontal line.

* * * * *